US011449772B2

(12) United States Patent
Pan et al.

(10) Patent No.: US 11,449,772 B2
(45) Date of Patent: Sep. 20, 2022

(54) PREDICTING OPERATIONAL STATUS OF SYSTEM

(71) Applicant: International Business Machines Corporation, Armonk, NY (US)

(72) Inventors: Tian Ming Pan, Beijing (CN); Peng Fei Tian, Beijing (CN); Bo Chen Zhu, Xi'an (CN); Yan Bin Hu, Beijing (CN); Ren Fu Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 16/583,868

(22) Filed: Sep. 26, 2019

(65) Prior Publication Data

US 2021/0097407 A1 Apr. 1, 2021

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ........ G06N 20/00; G06N 20/10; G06N 20/20; G06N 5/04; G06N 5/02; G06N 5/022; G06N 5/00; G06N 7/00; G06N 7/005; G06N 7/04
See application file for complete search history.

(56) References Cited

U.S. PATENT DOCUMENTS

| 9,727,821 | B2 | 8/2017 | Lin et al. |
| 10,916,333 | B1* | 2/2021 | Yeturu ................... G06N 5/003 |
| 2012/0316835 | A1 | 12/2012 | Maeda et al. |
| 2015/0033086 | A1 | 1/2015 | Sasturkar et al. |
| 2016/0092681 | A1 | 3/2016 | Valles et al. |
| 2017/0353477 | A1 | 12/2017 | Faigon et al. |

OTHER PUBLICATIONS

Salman et al. "Machine Learning for Anomaly Detection and Categorization in Multi-Cloud Environments", Jun. 2017 https://ieeexplore.ieee.org/abstract/document/7987183 (Year: 2017).*
Hu et al. "AdaBoost-Based Algorithm for Network Intrusion Detection", Mar. 2008 https://ieeexplore.ieee.org/abstract/document/4454220 (Year: 2008).*

(Continued)

*Primary Examiner* — Kamran Afshar
*Assistant Examiner* — Shoun J Abraham
(74) *Attorney, Agent, or Firm* — Edward J. Wixted, III

(57) ABSTRACT

In an approach, a processor obtains a first set of training samples, one of the training samples including values of a plurality of performance indicators of a target system observed at a historical point in time. A processor determines whether the first set of training samples are qualified for training a prediction model, the prediction model predicting an operational status of the target system at a target point in time based on values of the plurality of performance indicators observed at the target point in time. A processor, in response to determining that the first set of training samples are qualified for training the prediction model, trains, the prediction model based on the first set of training samples.

20 Claims, 10 Drawing Sheets

(56) References Cited

OTHER PUBLICATIONS

Shin "Graphs and ML: Multiple Linear Regression", Jul. 30, 2018 https://towardsdatascience.com/graphs-and-ml-multiple-linear-regression-c6920a1f2e70 (Year: 2018).*

Hu et al. "Online Adaboost-Based Parameterized Methods for Dynamic Distributed Network Intrusion Detection", Mar. 2013 https://ieeexplore.ieee.org/abstract/document/6488798 (Year: 2013).*

Chen et al. "Combining Incremental Hidden Markov Model and Adaboost Algorithm for Anomaly Intrusion Detection", Jun. 28, 2009 https://dl.acm.org/doi/abs/10.1145/1599272.1599276 (Year: 2009).*

"The Dynatrace analytics-based approach to anomaly detection", Anomaly detection powered by AI—Dynatrace, Printed Aug. 9, 2019, 4 pages, <https://www.dynatrace.com/platform/artificial-intelligence/anomaly-detection/>.

Mell et al., "The NIST Definition of Cloud Computing", Recommendations of the National Institute of Standards and Technology, Special Publication 800-145, Sep. 2011, 7 pages.

\* cited by examiner

PREDICTING OPERATIONAL STATUS OF SYSTEM

BACKGROUND

The present invention relates to system management, and more specifically, to a method, a system, and a computer program product for predicting an operational status of a system.

Along with the increasing size and complexity of an information system, a monitoring system needs to monitor more and more performance indicators of the information system to help a user determine whether the information system is normal or abnormal. However, the monitoring system may only present observed values of these performance indicators to the user. That is, the user has to read a huge amount of monitoring results and analyze them by himself/herself to find out the operational status of the information system.

SUMMARY

Aspects of an embodiment of the present invention disclose a method, computer program product, and computing system. A processor obtains a first set of training samples, one of the training samples including values of a plurality of performance indicators of a target system observed at a historical point in time. A processor determines whether the first set of training samples are qualified for training a prediction model, the prediction model predicting an operational status of the target system at a target point in time based on values of the plurality of performance indicators observed at the target point in time. A processor, in response to determining that the first set of training samples are qualified for training the prediction model, trains the prediction model based on the first set of training samples.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
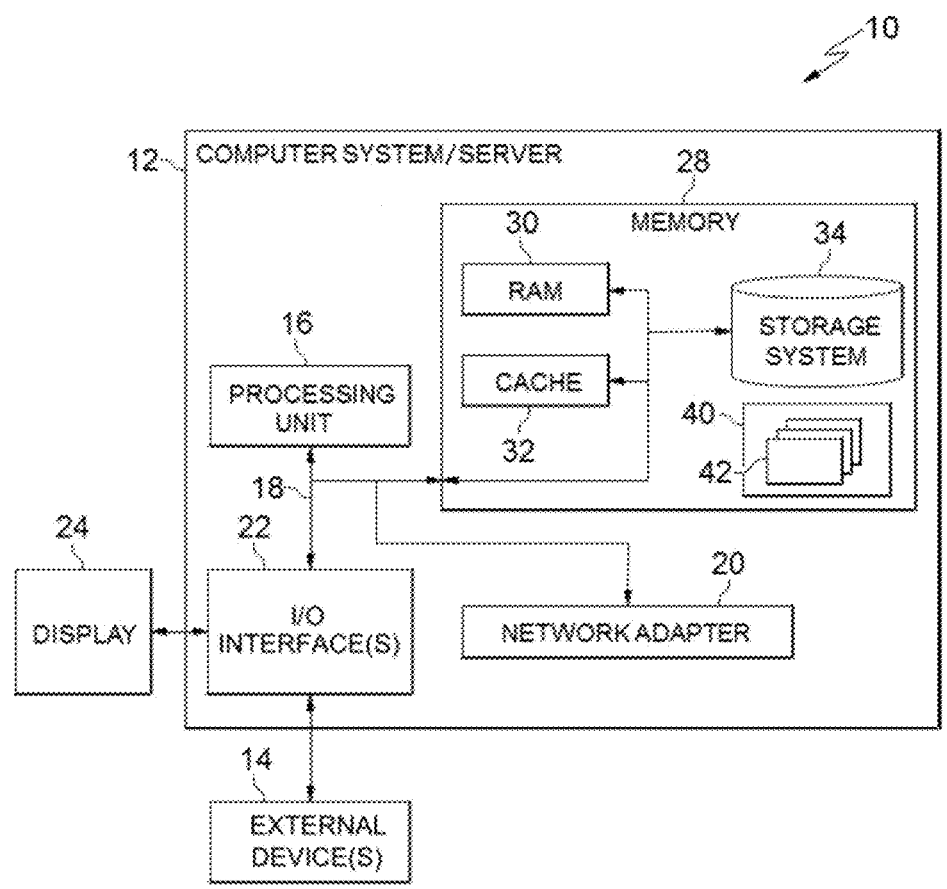
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
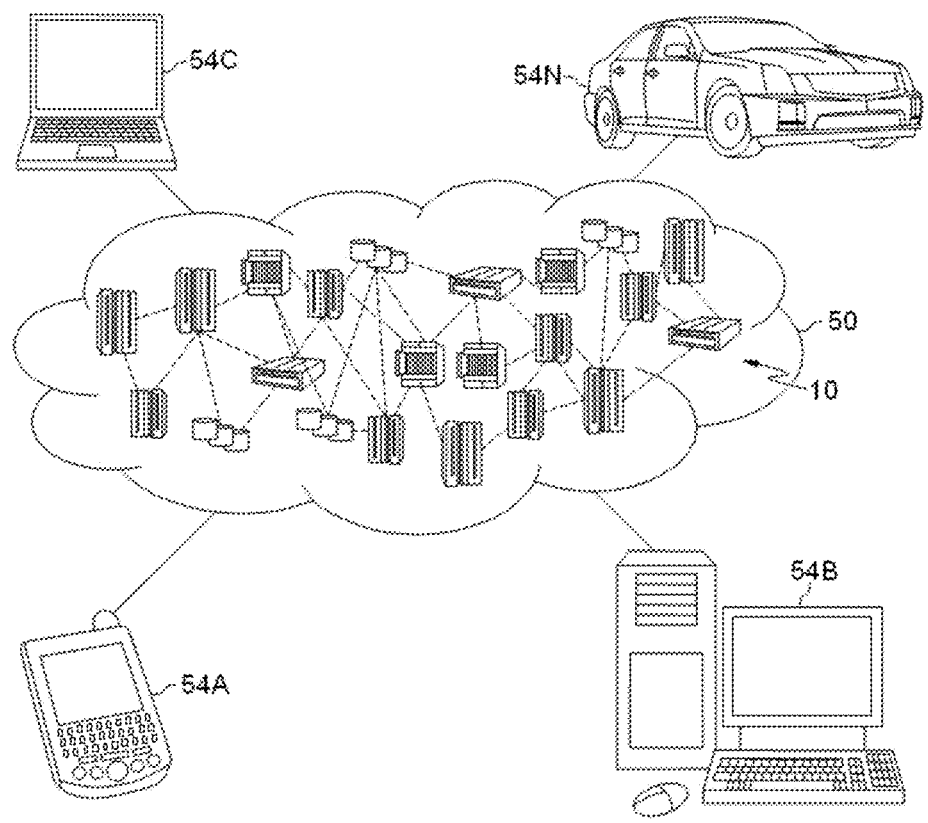
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
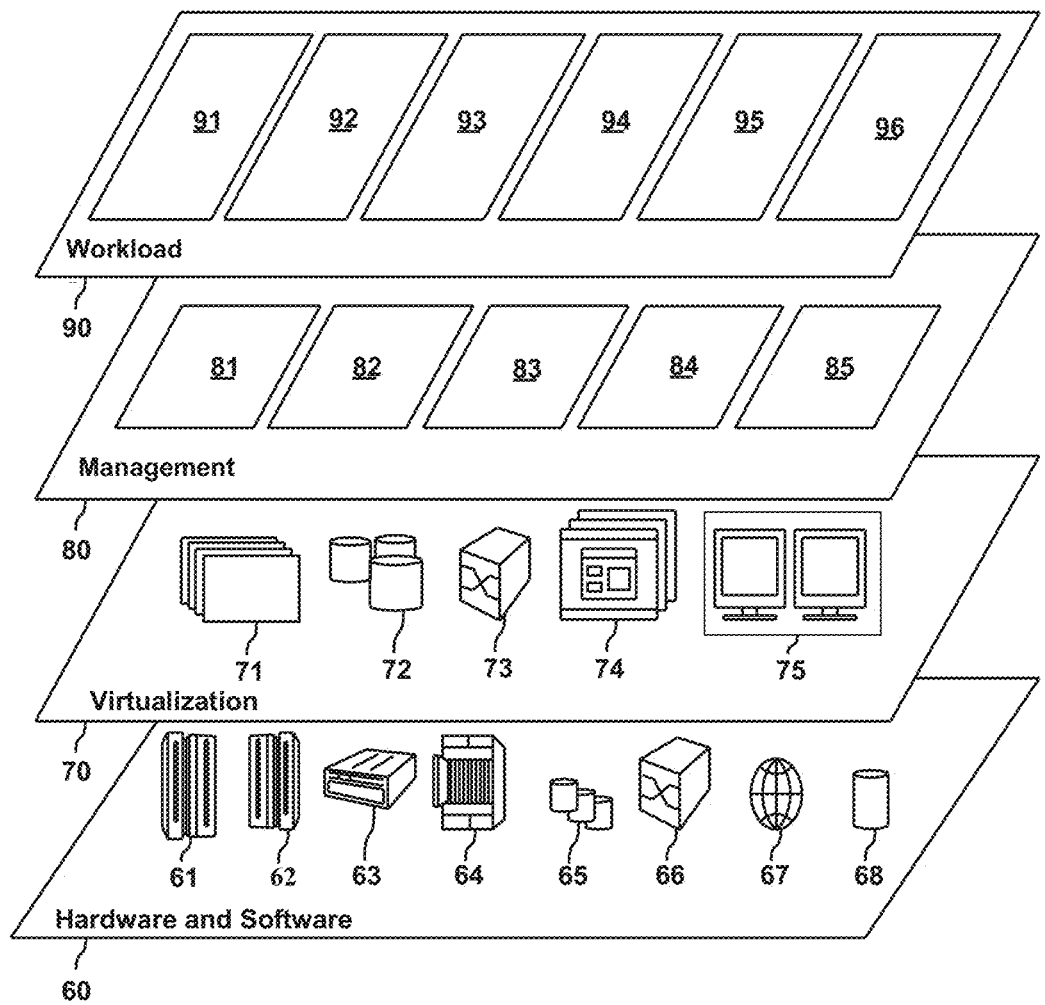
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system status prediction 96. Hereinafter, reference will be made to FIG. 4 to FIG. 10 to describe details of the system status prediction 96.

Along with the increasing size and complexity of an information system, a monitoring system needs to monitor more and more performance indicators of the information system to help a user determine whether the information system is normal or abnormal. However, the monitoring system may only present observed values of these performance indicators to the user. That is, the user has to read a huge amount of monitoring results and analyze them by himself/herself to find out the operational status of the information system.

However, since the user may not have enough background knowledge, it is usually difficult for the user to understand the real meaning of values of these performance indicators in a big information system. Further, the number of performance indicators being monitored may increase over time. It is impossible for the user to find out an operational status of the information system through the monitoring results involving a huge number of performance indicators. Since there is no efficient way to analyze the monitoring results jointly, it is difficult to provide the user with a correct insight about the system status.

In order to, at least partially, solve the above and other potential problems, embodiments of the present invention provide a solution for predicting an operational status of a system. According to embodiments of the present disclosure, a set of training samples are obtained, each of the training samples including values of a plurality of performance indicators of a target system observed at a historical time point. It is determined whether the set of training samples are qualified for training a prediction model, which will predict an operational status of the target system at a target time point based on values of the plurality of performance indicators observed at the target time point. In response to determining that the set of training samples are qualified for training the prediction model, the prediction model will be trained based on the set of training samples. In response to determining that the set of training samples are unqualified for training the prediction model, a dimensional transformation will be performed on the set of training samples. In response to determining that the transformed set of training samples are qualified for training the prediction model, the prediction model will be trained based on the transformed set of training samples. The trained prediction model can be used to automatically predict an operational status of the target system at the target time point based on observed values of performance indicators of the target system observed at the target time point. For example, the operational status may indicate one or more of the following: whether the target system is normal or abnormal, whether the target system is overloaded or under-loaded, or so on. As such, the monitoring system can provide, based on the prediction model, a user friendly interface to users which helps the users find out the operational status of an information system.

Figure 4:
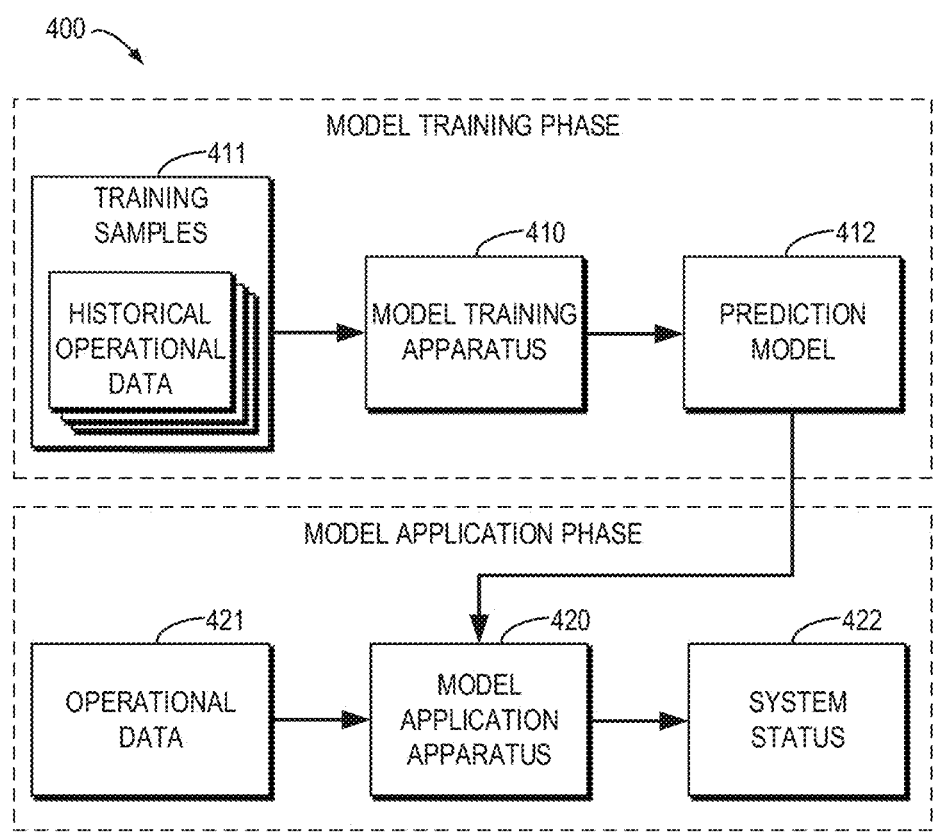
FIG. 4 depicts an environment in which embodiments of the present disclosure can be implemented.

With reference now to FIG. 4, an environment 400 in which embodiments of the present disclosure can be implemented is shown. It is to be understood that the structure and functionality of the environment 400 are described only for the purpose of illustration without suggesting any limitations as to the scope of the present disclosure. The embodiments of the present disclosure can be embodied with a different structure and/or functionality.

As shown in FIG. 4, the environment 400 may generally comprise a model training apparatus 410 and a model application apparatus 420. According to embodiments of the present disclosure, the solution for predicting a system status may comprise two phases: a model training phase and a model application phase.

During the model training phase, the model training apparatus 410 may receive a set of training samples 411 and train a prediction model 412 based on the set of training samples 411. Each training sample in the set of training samples 411 may include historical operational data of a target system, such as, an information system, a computing system, a data storage system, or so on. Examples of the target system may include, but is not limited to, a data processing system, a management information system, a decision sustainment system, an office automation system, and/or any other system currently known or to be developed in the future. The historical operational data (such as, one training sample in the set of training samples 411) may include values of a plurality of performance indicators of the target system observed at a historical time point. Alternatively, the historical operational data may include maximum values, minimum values, and/or average values of the plurality of performance indicators of the target system observed during a historical time period. Examples of a performance indicator of a system may include, but is not limited to, CPU usage, memory consumption, disk usage or so on. The prediction model 412 may be trained based on a machine learning algorithm. The trained prediction model 412 can predict an operational status of the target system (such as normal or abnormal, overloaded or under-loaded, or so on) based on operational data of the target system. The operational data of the target system may include a group of values of the plurality of performance indicators of the target system observed at a target time point. As used herein, the target time point may refer to a time point at which the operational status of the target system is to be predicted. The prediction model 412 may be provided to the model application apparatus 420.

During the model application phase, the model application apparatus 420 may receive operational data 421 of the target system, which includes a group of values of the plurality of performance indicators of the target system observed at a target time point. The model application apparatus 420 may use the prediction model 412 to predict a system status 422 based on the operational data 421. For example, the system status 422 may indicate whether the target system is normal or abnormal at the target time point, whether the target system is overloaded or under-loaded at the target time point, or so on.

Figure 5:
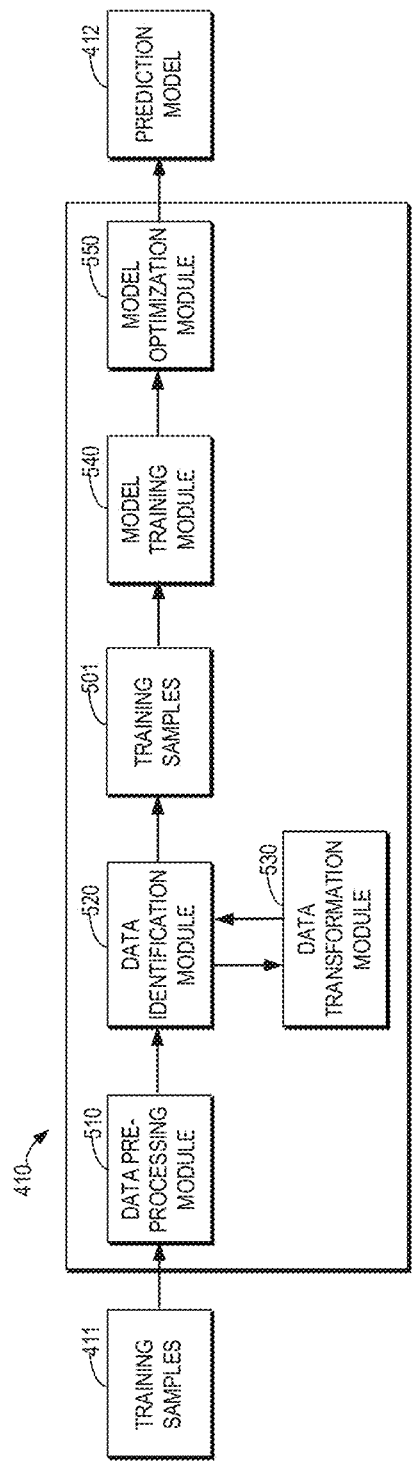
FIG. 5 depicts a block diagram of a model training system according to embodiments of the present disclosure.

FIG. 5 depicts a block diagram of the model training apparatus 410 according to embodiments of the present disclosure. As shown in FIG. 5, for example, the model training apparatus 410 may include a data pre-processing module 510, a data identification module 520, a data transformation module 530, a model training module 540 and a model optimization module 550. It is to be understood that the modules of the model training apparatus 410 in FIG. 5 are shown only for purpose of illustration, without suggesting any limitation to the scope of the present disclosure. In some embodiments, the model training apparatus 410 may include additional modules, and/or omit one or more illustrated modules.

In some embodiments, the data pre-processing module 510 may be configured to perform a pre-processing on the set of training samples 411, so as to improve data quality of the training samples 411. The pre-processing performed on the training samples 411 may include but not limited to, de-duplication, removing invalid data that is not in a reasonable range, or the like. In some embodiments, the data pre-processing module 510 can be omitted.

In some embodiments, the data identification module 520 may be configured to determine whether a set of training samples (such as, the set of training samples 411 which have been pre-processed by the data pre-processing module 510) are qualified for training a prediction model or not.

In some embodiments, the data identification module 520 may detect a data characteristic associated with an operational status of the target system from the set of training samples 411. In response to the data characteristic being detected from the set of training samples 411, the data identification module 520 may determine that the set of training samples 411 are qualified for training a prediction model which is to be used for predicting an operational status of the target system. In response to the data characteristic not being detected from the set of training samples 411, the data identification module 520 may determine that the set of training samples 411 are unqualified for training the prediction model.

The data characteristic may indicate that the regularity of the set of training samples 411 is sufficient for training the prediction model. In some embodiments, for example, the data identification module 520 may represent the set of training samples 411 as a set of points in a space having a number of dimensions. As described above, each of the training samples 411 may include a group of values of the plurality of performance indicators at a historical time point. Each of the plurality of performance indicators may be considered as one dimension of the space. That is, a group of values of the plurality of performance indicators (that is, a training sample) can be considered as coordinates of a point in the space. In some embodiments, the data identification module 520 may then determine whether a geometric representation of a predetermined shape is available in the space for fitting the set of points. The geometric representation may reflect the data characteristics associated with an operational status of the target system. In response to determining that the geometric representation is available in the space (that is, the regularity of the set of training samples 411 is sufficient for training the prediction model), the data identification module 520 may determine that the set of training samples 411 are qualified for training the prediction model. In response to determining that the geometric representation is unavailable in the space (that is, the regularity of the set of training samples 411 is insufficient for training the prediction model), the model training apparatus 410 may determine that the set of training samples 411 are unqualified for training the prediction model.

In some embodiments, if the number of performance indicators is two (that is, the space is a two-dimensional space), the geometric representation of a predetermined shape may be a line. Alternatively, if the number of performance indicators is more than two (that is, the number of dimensions of the space exceeds two), the geometric representation of a predetermined shape may be a plane. A line for a 2D space or a plane for a higher dimensional space is chosen to ensure convergence of the prediction model. If such a line or a plane can be found, it means that the regularity of the set of training samples 411 is sufficient for training a prediction model. That is, the data identification module 520 may attempt to find a line in a two-dimensional (2D) space or a plane in a higher dimensional space such that most of the training samples 411 can fall on or near the line or plane. For example, the data identification module 520 may attempt to find a line in a 2D space or a plane in a higher dimensional space such that the average of distances from the set of points (which represent the set of training samples 411) to the line or plane is below a threshold distance.

Figure 6:
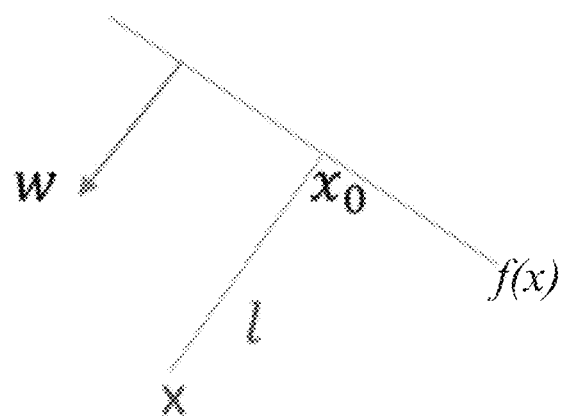
FIG. 6 depicts a schematic diagram for identifying qualification of a set of training samples according to embodiments of the present disclosure.

FIG. 6 depicts a schematic diagram of such principle. As shown in FIG. 6, it is assumed that a geometric representation (that is, a line or plane) to be discovered in the space is represented as below:

$$f(x) = w^T \cdot x + b \quad (1)$$

In the above formula, x represents a point (that is, a training sample) in the space, w represents a normal vector of f(x), and f(x) represents the data characteristic associated with an operational status of the target system to be discovered. It is also assumed that $x_0$ represents the projection of the point x on the geometric representation f(x), that is, $w^T \cdot x_0 + b = 0$. If l represents a distance from the point x to the geometric representation f(x), then the point x can be represented as:

$$x = x_0 + l \cdot \frac{w}{\|w\|} \quad (2)$$

In the above formula, $\|w\| = w^T \cdot w$. Therefore, the distance l can be represented as below:

$$l = \frac{w^T \cdot x + b}{\|w\|} \quad (3)$$

In some embodiments, the data identification module 520 may attempt to find a geometric representation f(x) which can satisfy the following constraint:

$$|l| \leq l_{threshold} \quad (4)$$

In the above formula, $l_{threshold}$ is a hyper-parameter that represents a threshold distance. $l_{threshold}$ can be predefined or determined in any manner currently known or to be developed in the future. If such geometric representation f(x) that satisfies the above constraint can be found, it means that the data characteristic associated with an operational status of the target system can be detected from the set of training samples 411. That is, the regularity of the set of training samples 411 is sufficient for training a prediction model. Thus, the data identification module 520 may determine that the set of training samples 411 are qualified for training a predication model. If such geometric representation f(x) that satisfies the above constraint cannot be found, it means that the data characteristic associated with an operational status of the target system cannot be detected from the set of training samples 411. Thus, the data identification module 520 may determine that the set of training samples 411 are unqualified for training a predication model.

With reference back to FIG. 5, in some embodiments, if the data identification module 520 determines that the set of training samples 411 are unqualified for training a predication model, the set of training samples 411 may be provided to the data transformation module 530. In some embodiments, the data transformation module 530 may be configured to perform a dimensional transformation on the set of training samples 411 such that the transformed set of training samples can be used for training the prediction model.

In some embodiments, as described above, the set of training samples 411 can be represented as a set of points in a first space having a first number of dimensions. In some embodiments, the data transformation module 530 may transform the first set of points in the first space into a second set of points in a second space having a second number of dimensions. In some embodiments, the second number may be different from the first number. For example, the second number may be greater than the first number, such as, by one. That is, if the data identification module 520 cannot find a line for fitting the set of training samples 411 in a 2D space, the data transformation module 530 may transform the set of training samples 411 from the 2D space to a three-dimensional (3D) space. If the data identification module 520 cannot find a plane for fitting the set of training samples 411 in a N-dimensional space (where N>2), the data transformation module 530 may transform the set of training samples from the N-dimensional space to a N+1-dimensional space.

In some embodiments, in order to transform the first set of points in the first space with the first number of dimensions (such as, N, where N≥2) into the second set of points in the second space with the second number of dimensions (such as, N+1, where N≥2), the data transformation module 530 may first determine the second number of points as landmarks. For example, the data transformation module 530 can determine the landmarks by selecting the second number of points from the first set of points. It is to be understood that the data transformation module 530 can also determine the landmarks in any other manner. In response to determining the landmarks, the data transformation module 530 may then determine a distance from each of the first set of points to each of the landmarks. The data transformation module 530 may determine, based on respective distances from one point in the first space to the landmarks, coordinates of a corresponding point in the second space. As such, the data transformation module 530 can transform the first set of points in the first space into the second set of points in the second space.

Figure 7:
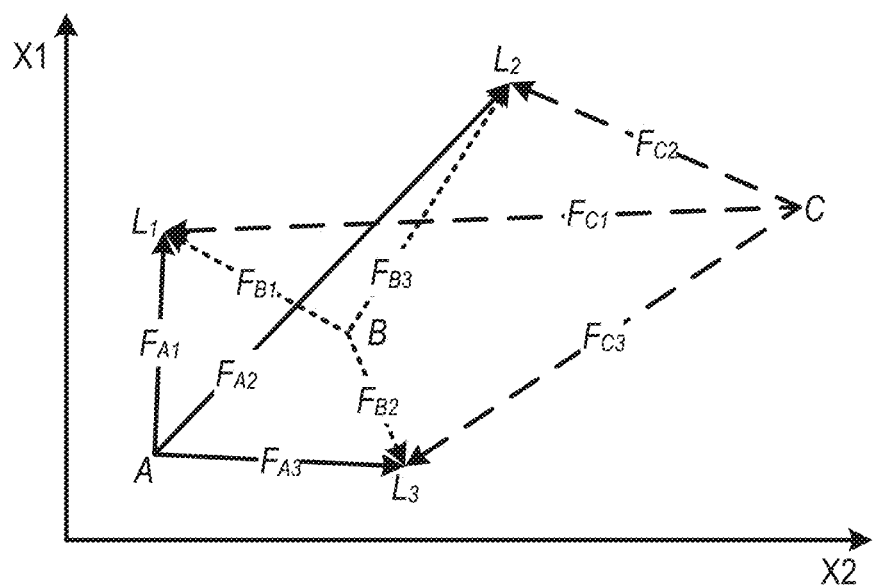
FIG. 7 depicts a schematic diagram of a dimensional transformation performed on a set of training samples according to embodiments of the present disclosure.

FIG. 7 depicts an example of such embodiments. In FIG. 7, it is assumed that the original set of training samples are a 2D dataset. That is, each training sample comprises values of two performance indicators. For example, the set of training samples may include three sample points A(1, 2.5), B(2, 2.5) and C(4.5, 3) (that is, the first set of points in a 2D space as described above). In order to transform the points A, B and C from a 2D space to a 3D space, as shown in FIG. 7, three landmarks are determined by the data transformation module 530, which are $L_1(1, 3)$, $L_2(3, 4)$ and $L_3(2, 2)$. The data transformation module 530 may determine the distance from each of the points A, B and C to each of the landmarks $L_1$, $L_2$ and $L_3$. For example, if $F_{Ai}$ represents a distance from the point A to a landmark $L_i$ (where i=1, 2 or 3), $F_{Ai}$ can be calculated as below:

$$F_{Ai} = \exp\left(-\frac{\|x - l_i\|^2}{2\partial^2}\right) \tag{5}$$

As shown above, $\partial$ represents the standard deviation of the original dataset. $F_{Bi}$ and $F_{Ci}$ can be likewise calculated. As such, the points A, B and C in the 2D space can be transformed into points A', B' and C' in the 3D space, where coordinates of the point A' in the 3D space are ($F_{A1}$, $F_{A2}$, $F_{A3}$), coordinates of the point B' in the 3D space are ($F_{B1}$, $F_{B2}$, $F_{B3}$) and coordinates of the point C' in the 3D space are ($F_{C1}$, $F_{C2}$, $F_{C3}$).

With reference back to FIG. 5, in some embodiments, the data transformation module 530 may provide the transformed set of training samples back to the data identification module 520, so as to evaluate whether the transformed set of training samples 411 are qualified for training a prediction model. In some embodiments, if the data identification module 520 determines that a set of training samples 501 (such as, the set of training samples 411 or the transformed set of training samples) are qualified for training a prediction model, the data identification module 520 may provide the set of training samples 501 to the model training module 540. In some embodiments, the model training module 540 may be configured to train a prediction model based on the set of training samples 501.

In some embodiments, the model training module 540 may generate an objective function for training the prediction model and determine at least one parameter of the prediction model such that the objective function is minimized. In some embodiments, the model training module 540 may estimate a first ratio of training samples that are predicted to be indicative of a predetermined operational status of a system to the set of training samples 501. The model training module 540 may determine a second ratio of training samples that actually indicate the predetermined operational status of the target system to the set of training samples 501. Then, the model training module 540 may generate the objective function based on the first and second ratios. Only for the purpose of illustration, in the following, it is assumed that the prediction model is trained for predicting whether the target system is normal or abnormal. In this case, for example, the predetermined operational status may refer to an abnormal status of the target system. It is to be understood that, in other embodiments, if the prediction model is trained for predicting whether the target system is overloaded or under-loaded, the predetermined operational status may refer to an overloaded or under-loaded status of the target system.

As described above, a geometric representation f(x) for fitting the set of training samples 501 has been determined. It is assumed that one training sample of the set of training samples 501 is represented as x, and a prediction result of the training sample $x_i$ is presented as $y_i$, where if $\|y_i - f(x_i)\| > 1$, it means that the training sample $x_i$ may indicate an abnormal system status and if $\|y_i - f(x_i)\| \leq 1$, it means that the training sample $x_i$ may indicate a normal system status. In some embodiments, a hypothesis function which predicts a percent of abnormal training samples (each of which is predicted to be indicative of an abnormal system status) can be represented as below:

$$h(l) = \frac{\text{sum}(\|y_i - f(x_i)\| > l)}{\text{sum(training samples)}} * 100 \tag{6}$$

Above, sum ($\|y_i - f(x_i)\| > l$) represents the predicted number of abnormal training samples in the set of training samples 501, and sum (training samples) represents the total number of training samples in the set of training samples 501. The loss function for training the prediction model can be determined as below:

$$\text{loss}(l) = \frac{1}{m} * \sqrt{\sum_{i=1}^{m}(h(l) - y)^2} \tag{7}$$

In the above formula, y represents an actual percent of abnormal training samples (each of which actually indicates a normal system status) in the set of training samples 501. For example, when each training sample was collected at a historical time point, the training sample can be tagged with a label indicating whether the target system was normal or abnormal at the historical time point. It is to be understood that, in other embodiments, if the prediction model is trained for predicting whether the target system is overloaded or under-loaded, each training sample can be tagged with a different label indicating whether the target system was overloaded or under-loaded at the historical time point. The actual percentage y of abnormal training samples in the set of training samples can be determined based on the labels of the training samples. In this way, the model training module 540 can determine the parameter l such that the loss function loss (l) is minimized.

Figure 8A:
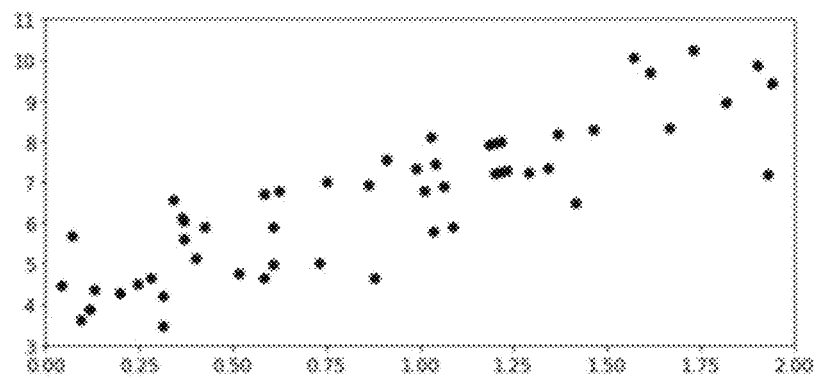
FIGS. 8A-8C depict schematic diagrams for training a prediction model based on a set of training samples according to embodiments of the present disclosure.
Figure 8B:
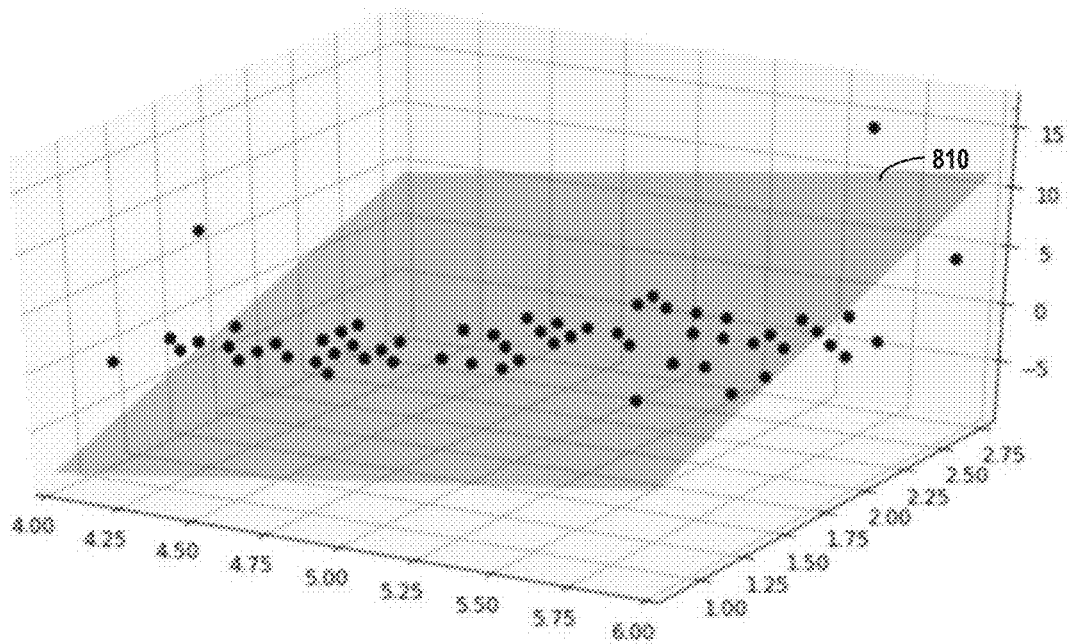
Figure 8C:
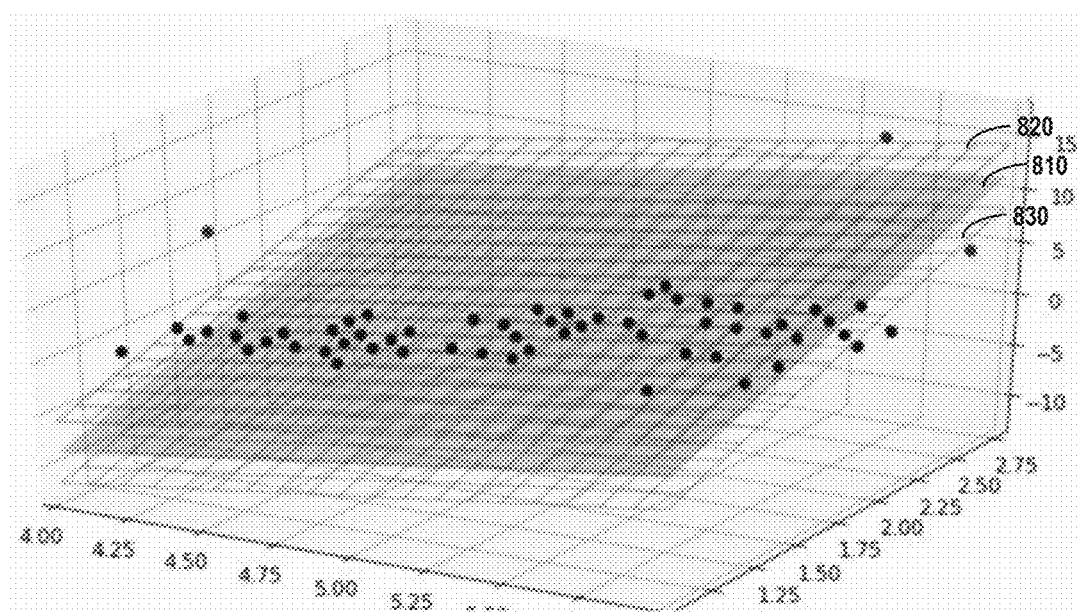

FIGS. 8A-8C depict schematic diagrams for training a prediction model based on a set of training samples in accordance with embodiments of the present disclosure. As shown in FIG. 8A, for example, an original set of training samples 411 may be in a 2D space. The data identification module 520 may fail to find a line in the 2D space for fitting the original set of training samples 411. Therefore, the data identification module 520 may provide the original set of training samples 411 to the data transformation module 530 for dimensional transformation. As shown in FIG. 8B, the data transformation module 530 may transform the original set of training samples 411 from the 2D space into a 3D space. A plane 810 for fitting the transformed set of training samples 501 can be found in the 3D space by the data identification module 520. Thus, the data identification module 520 provides the transformed set of training samples 501 to the model training module 540. As shown in FIG. 8C, the model training module 540 may train a prediction model based on the transformed set of training samples 501. The prediction model may be represented by two planes 820 and 830 that are parallel to the plane 810, where most of the transformed training samples fall between the two planes. For example, the distance from each of the two planes 820 and 830 to the plane 810 may correspond to the determined parameter of the prediction model (that is, l as described above).

As such, a prediction model can be trained by the model training module 540. The trained prediction model can be used to automatically predict the system status 422 based on the operational data 421. For example, the system status 422 may indicate whether the target system is normal or abnormal at the target time point, whether the target system is overloaded or under-loaded at the target time point, or so on.

In some embodiments, in order to improve the accuracy of the prediction model, the predication model can be optimized.

With reference to FIG. 5, in some embodiments, the model training apparatus 410 may also include a model optimization module 550, which may be configured to optimize the prediction model trained by the model training module 540, so as to improve the accuracy of the prediction model. It is to be understood that, in some embodiments, the model optimization module 550 can be omitted.

In some embodiments, the model optimization module 550 may generate a plurality of model instances for the prediction model. Each model instance may be a copy of the predication model. The model optimization module 550 may determine respective weights of the plurality of model instances, and then combine the plurality of model instances into an optimized model (such as, the prediction model 412 as shown in FIG. 4) based on the determined weights of the plurality of model instances.

In some embodiments, in order to determine a weight of a model instance, the model optimization module 550 may first determine respective weights of the set of training samples 501. Then, for each training sample in the set of training samples 501, the model optimization module 550 may use the model instance to predict a system status based on the training sample. As such, the model optimization module 550 can determine a set of prediction results based on the set of training samples 501 by using the model instance. The model optimization module 550 may further determine the weight of the model instance based on the weights of the set of training samples and the set of prediction results.

In the following, it is assumed that the number of the generated model instances is P (where P>1) and the number of training samples in the set of training samples 501 is m (where m≥1). Initially, the model optimization module 550 may assign a same weight to each of the training samples. That is, $$w_i = \frac{1}{m},$$

where $w_i$ represents a weight of the $i^{th}$ sample in the set of training samples and $1 \leq i \leq m$. For the $j^{th}$ model instance in the total P model instances (where $1 \leq j \leq P$), the weighted error can be calculated as below:

$$r_j = \frac{\sum_{i=1}^{m} w_i (\text{where } \hat{y}_i \neq y_i)}{\sum_{i=1}^{m} w_i} \quad (8)$$

In the above formula, $\hat{y}_i$ represents the predicted result based on the $i^{th}$ sample and $y_i$ represents the actual system status (such as normal or abnormal) indicated by the $i^{th}$ sample. Then, the weight of the $j^{th}$ model instance can be calculated as below:

$$\alpha_j = \beta * \log \frac{1 - r_j}{r_j} \quad (9)$$

Above, β represents the learning rate of the model, which can be predefined or determined in any other manner. Then, the weight of the $i^{th}$ sample can be updated based on the predicted result and the weight of the $j^{th}$ model instance. For example, the weight of the $i^{th}$ sample can be updated as below:

$$w_i = \begin{cases} w_i, & \text{if } \hat{y}_i = y_i \\ w_i \exp(\alpha_j), & \text{if } \hat{y}_i \neq y_i \end{cases} \quad (10)$$

The updated weights can be used by the model optimization module 550 to determine a weight for a next model instance, such as, the (j+1)th model instance.

In some embodiments, in response to determining the weights of the plurality of model instances, the model optimization module 550 may combine the plurality of model instance into the optimized model based on the determined weights of the plurality of model instances. The optimized model can be used to automatically predict the system status 422 based on the operational data 421.

Figure 9:
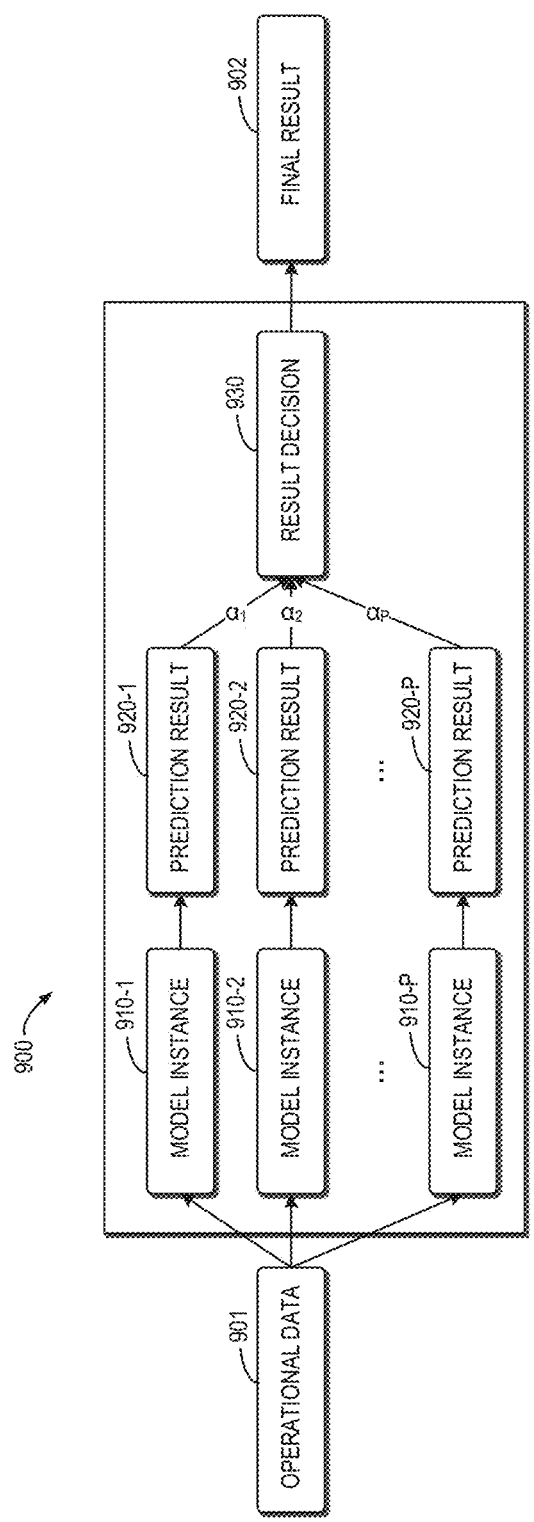
FIG. 9 depicts a schematic diagram of an optimized prediction model according to embodiments of the present disclosure.

FIG. 9 depicts a schematic diagram of an optimized prediction model 900 according to embodiments of the present disclosure. For example, the prediction model 900 can be considered as an example implementation of the prediction model 412 as shown in FIG. 4. Only for the purpose of illustration, it is assumed that the predication model is trained for predicting whether a target system is normal or abnormal based on operational data of the target system. As shown in FIG. 9, the optimized prediction model 900 may include model instances 910-1, 910-2 . . . 910-P (collectively referred to as model instances 910 or individually referred to as model instance 910). For example, respective weights of the model instances 910 are $\alpha\_1, \alpha\_2 \ldots \alpha\_P$, which have been determined as described above. In response to operational data 901 (such as, a group of values of performance indicators of a system) being input to the model 900, the model instances 910 may generate a set of prediction results 920-1, 920-2, . . . 920-P (collectively referred to as prediction results 920), each of which may indicate whether the target system is normal or abnormal. A result decision unit 930 may generate a final result 902 based on the set of prediction results 920 and respective weights of the model instances 910. For example, the result decision unit 930 may calculate a first sum of weights of model instances which predict that the target system is normal and calculate a second sum of weights of model instances which predict that the target system is abnormal. If the first sum exceeds the second sum, the result decision unit 930 may generate the final result 902 indicating that the target system is normal. Otherwise, if the first sum is below the second sum, the result decision unit 930 may generate the final result 902 indicating that the target system is abnormal.

As such, the prediction model trained by the model training module 540 can be optimized by the model optimization module 550. The optimized prediction model (such as, the prediction model 412 as shown in FIG. 4) can be used to automatically predict the system status 422 based on the operational data 421.

Figure 10:
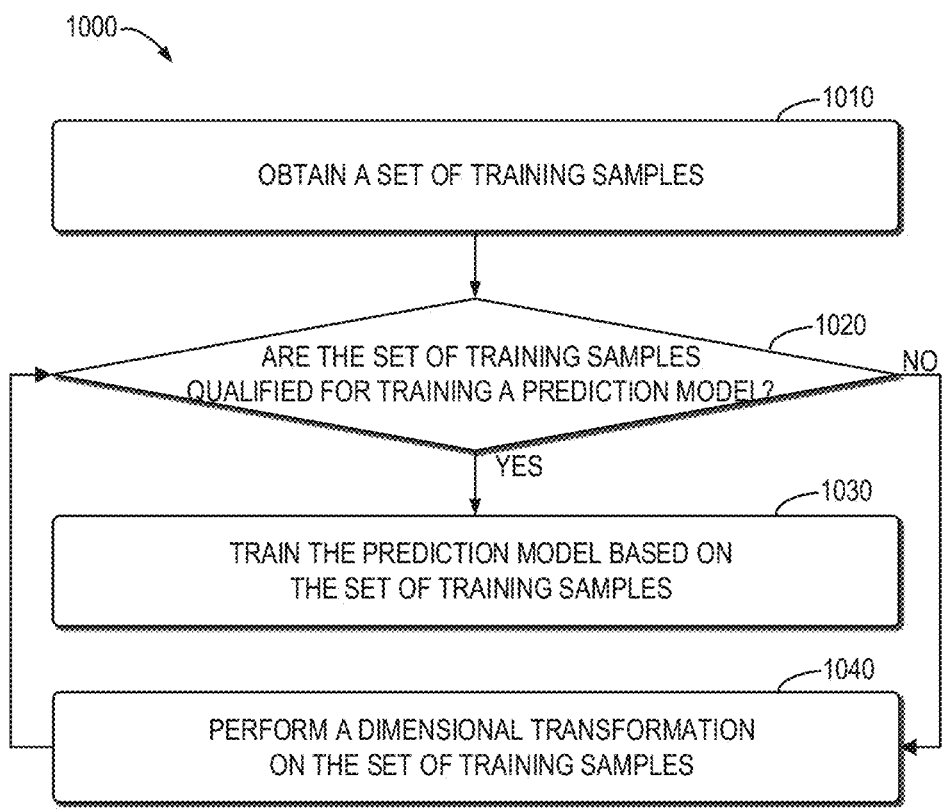
FIG. 10 depicts a flowchart of an example method for training a prediction model according to embodiments of the present disclosure.

FIG. 10 depicts a flowchart of an example method 1000 for training a prediction model according to embodiments of the present disclosure. For example, the method 1000 may be implemented by the model training apparatus 410 as shown in FIGS. 4-5. It is to be understood that the method 1000 may also comprise additional blocks (not shown)

and/or may omit the illustrated blocks. The scope of the present disclosure described herein is not limited in this aspect.

At block 1010, the model training apparatus 410 obtains a set of training samples. One of the training samples includes values of a plurality of performance indicators of a target system observed at a historical time point.

At block 1020, the model training apparatus 410 determines whether the set of training samples are qualified for training a prediction model. The prediction model may predict an operational status of the target system based on values of the plurality of performance indicators observed at a target time point.

In some embodiments, the model training apparatus 410 may detect a data characteristic associated with an operational status of the target system from the set of training samples. In response to the data characteristic being detected from the set of training samples, the model training apparatus 410 may determine that the set of training samples are qualified for training the prediction model. In response to the data characteristic not being detected from the set of training samples, the model training apparatus 410 may determine that the set of training samples are unqualified for training the prediction model.

In some embodiments, the model training apparatus 410 may represent the set of training samples as a set of points in a space having a number of dimensions. One of the plurality of performance indicators corresponds to one of the number of dimensions. The model training apparatus 410 may determine whether a geometric representation of a predetermined shape is available in the space for fitting the set of points. The geometric representation reflects the data characteristic. In response to determining that the geometric representation is available in the space, the model training apparatus 410 may determine that the data characteristic is detected from the set of training samples. In response to determining that the geometric representation is unavailable in the space, the model training apparatus 410 may determine that the data characteristic is not detected from the set of training samples.

In response to determining that the set of training samples are qualified for training the prediction model, at block 1030, the model training apparatus 410 trains the prediction model based on the set of training samples.

In some embodiments, the model training apparatus 410 may generate an objective function for training the prediction model. The model training apparatus 410 may determine at least one parameter of the prediction model such that the objective function is minimized.

In some embodiments, the model training apparatus 410 may generate the objective function by estimating a first ratio of training samples that are predicted to be indicative of an abnormal status of the target system to the set of training samples; determining a second ratio of training samples that actually indicate the abnormal status of the target system to the set of training samples; and generating the objective function the objective function based on the first and second ratios.

In response to determining that the set of training samples are unqualified for training the prediction model, at block 1040, the model training apparatus 410 performs a dimensional transformation on the set of training samples.

In some embodiments, the model training apparatus 410 may represent the set of training samples as a first set of points in a first space having a first number of dimensions. One of the plurality of performance indicators corresponds to one of the first number of dimensions. The model training apparatus 410 may transform the first set of points in the first space into a second set of points in a second space having a second number of dimensions. The second number is different from the first number. In some embodiments, the second number may be greater than the first number. The model training apparatus 410 may determine the transformed set of training samples based on respective positions of the second set of points in the second space.

Then, the method 1000 proceeds to block 1020, where the model training apparatus 410 determines whether the transformed set of training samples are qualified for training the prediction model. In response to determining that the transformed set of training samples are qualified for training the prediction model, at block 1030, the model training apparatus 410 trains the prediction model based on the transformed set of training samples. In response to determining that the transformed set of training samples are unqualified for training the prediction model, at block 1040, the model training apparatus 410 performs a further dimensional transformation on the transformed set of training samples.

Alternatively, or in addition, in some embodiments, the model training apparatus 410 may further optimize the prediction model. In some embodiments, the model training apparatus 410 may generate a plurality of model instances for the prediction model. The model training apparatus 410 may determine respective weights of the plurality of model instances. Then, the model training apparatus 410 may combine the plurality of model instances into an optimized prediction model based on the weights of the plurality of model instances.

In some embodiments, the plurality of model instances may comprise a first model instance. The model training apparatus 410 may determine respective weights of the first set of training samples. The model training apparatus 410 may determine a first set of prediction results based on the first set of training samples by using the first model instance. The model training apparatus 410 may then determine a first weight of the first model instance based on the weights of the first set of training samples and the first set of prediction results.

In some embodiments, the plurality of model instances may further comprise a second model instance. The model training apparatus 410 may update the weights of the first set of training samples based on the first weight of the first model instance. The model training apparatus 410 may determine a second set of prediction results based on the first set of training samples by using the second model instance. The model training apparatus 410 may then determine a second weight of the second model instance based on the updated weights of the first set of training samples and the second set of prediction results.

It can be seen that, according to embodiments of the present invention, a set of training samples are obtained, each of the training samples including values of a plurality of performance indicators of a system at a historical time point. It is determined whether the set of training samples are qualified for training a prediction model, which will predict an operational status of the target system based on values of the plurality of performance indicators observed at a target time point. In response to determining that the set of training samples are qualified for training the prediction model, the prediction model will be trained based on the set of training samples. In response to determining that the set of training samples are unqualified for training the prediction model, a dimensional transformation will be performed on the set of training samples. In response to determining that the transformed set of training samples are qualified for training the prediction model, the prediction model will be trained based on the transformed set of training samples. The trained prediction model can be used to automatically predict an operational status of a system at a target time point based on values of performance indicators of the target system observed at the target time point. For example, the operational status may indicate one of the following: whether the target system is normal or abnormal at the target time point, whether the target system is overloaded or under-loaded at the target time point, or so on. As such, the monitoring system can provide, based on the prediction model, a user friendly interface to users which helps them to find out the operational status of their information system.

It should be noted that the prediction of the system status according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by one or more processors, a first set of training samples, one of the training samples including values of a plurality of performance indicators of a target system observed at a historical point in time;
   determining, by one or more processors, that the first set of training samples are unqualified for training a prediction model, the prediction model predicting an operational status of the target system at a target point in time based on values of the plurality of performance indicators observed at the target point in time;
   performing, by one or more processors, a dimensional transformation on the first set of training samples, the dimensional transformation comprising:
      representing, by one or more processors, the first set of training samples as a first set of points in a first space having a first number of dimensions, one of the plurality of performance indicators corresponding to one of the number of dimensions; and
      transforming, by one or more processors, the first set of points in the first space having the first number of dimensions to a second set of points in a second space having a second number of dimensions, wherein the first number of dimensions is different than the second number of dimensions;
   determining, by one or more processors, that the transformed first set of training samples are qualified for training the prediction model; and
   in response to determining that the transformed first set of training samples are qualified for training the prediction model, training, by one or more processors, the prediction model based on the transformed first set of training samples.

2. The method of claim 1, wherein determining that the transformed first set of training samples are qualified for training the prediction model comprises:
   detecting, by one or more processors, a data characteristic associated with the operational status of the target system from the transformed first set of training samples; and
   in response to the data characteristic being detected from the transformed first set of training samples, determining, by one or more processors, that the transformed first set of training samples are qualified for training the prediction model.

3. The method of claim 2, wherein detecting the data characteristic from the transformed first set of training samples comprises:
   determining, by one or more processors, that a geometric representation of a predetermined shape is available in the second space for fitting the second set of points, the geometric representation reflecting the data characteristic; and
   in response to determining that the geometric representation is available in the second space, determining, by one or more processors, that the data characteristic is detected from the transformed first set of training samples.

4. The method of claim 1, wherein training the prediction model comprises:
   generating, by one or more processors, an objective function for training the prediction model; and
   determining, by one or more processors, at least one parameter of the prediction model such that the objective function is minimized.

5. The method of claim 4, wherein generating the objective function comprises:
   estimating, by one or more processors, a first ratio of training samples that are predicted to be indicative of an abnormal status of the target system to the transformed first set of training samples;
   determining, by one or more processors, a second ratio of training samples that indicate the abnormal status of the target system to the transformed first set of training samples; and
   generating, by one or more processors, the objective function based on the first and second ratios.

6. The method of claim 1, further comprising:
   generating, by one or more processors, a plurality of model instances for the prediction model;
   determining, by one or more processors, respective weights of the plurality of model instances; and
   combining, by one or more processors, the plurality of model instances into an optimized prediction model based on the weights of the plurality of model instances.

7. The method of claim 6, wherein the plurality of model instances comprise a first model instance, and wherein determining respective weights of the plurality of model instances comprises:
   determining, by one or more processors, respective weights of the transformed first set of training samples;
   determining, by one or more processors, a first set of prediction results based on the transformed first set of training samples by using the first model instance; and
   determining, by one or more processors, a first weight of the first model instance based on the weights of the transformed first set of training samples and the first set of prediction results.

8. The method of claim 7, wherein the plurality of model instances further comprise a second model instance, and wherein determining respective weights of the plurality of model instances comprises:
   updating, by one or more processors, the weights of the transformed first set of training samples based on the first weight of the first model instance;

determining, by one or more processors, a second set of prediction results based on the transformed first set of training samples by using the second model instance; and determining, by one or more processors, a second weight of the second model instance based on the updated weights of the transformed first set of training samples and the second set of prediction results.

9. The method of claim 1, wherein performing the dimensional transformation further comprises:

identifying, by one or more processors, the second set of points as landmarks;

determining, by one or more processors, a respective distance from each of the first set of points to each of the landmarks; and determining, by one or more processors, coordinates of each corresponding point in the second space based on respective distances from one point in the first space to the landmarks.

10. A computer program product comprising:

one or more computer readable storage media and program instructions stored on the one or more computer readable storage media, the program instructions comprising:

program instructions to obtain a first set of training samples, one of the training samples including values of a plurality of performance indicators of a target system observed at a historical point in time;

program instructions to determine that the first set of training samples are unqualified for training a prediction model, the prediction model predicting an operational status of the target system at a target point in time based on values of the plurality of performance indicators observed at the target point in time;

program instructions to perform a dimensional transformation on the first set of training samples, the dimensional transformation comprising:

program instructions to represent the first set of training samples as a first set of points in a first space having a first number of dimensions, one of the plurality of performance indicators corresponding to one of the number of dimensions; and program instructions to transform the first set of points in the first space having the first number of dimensions to a second set of points in a second space having a second number of dimensions, wherein the first number of dimensions is different than the second number of dimensions;

program instructions to determine that the transformed first set of training samples are qualified for training the prediction model; and program instructions to, in response to determining that the first set of training samples are qualified for training the prediction model, train the prediction model based on the first set of training samples.

11. The computer program product of claim 10, wherein program instructions to determine that the transformed first set of training samples are qualified for training the prediction model comprise:

program instructions to detect a data characteristic associated with the operational status of the target system from the transformed first set of training samples; and program instructions to, in response to the data characteristic being detected from the transformed first set of training samples, determine that the transformed first set of training samples are qualified for training the prediction model.

12. The computer program product of claim 11, wherein program instructions to detect the data characteristic from the transformed first set of training samples comprise:

program instructions to determine that a geometric representation of a predetermined shape is available in the second space for fitting the second set of points, the geometric representation reflecting the data characteristic; and program instructions to, in response to determining that the geometric representation is available in the second space, determine that the data characteristic is detected from the transformed first set of training samples.

13. The computer program product of claim 10, wherein program instructions to train the prediction model comprise:

program instructions to generate an objective function for training the prediction model; and program instructions to determine at least one parameter of the prediction model such that the objective function is minimized.

14. The computer program product of claim 13, wherein program instructions to generate the objective function comprise:

program instructions to estimate a first ratio of training samples that are predicted to be indicative of an abnormal status of the target system to the transformed first set of training samples;

program instructions to determine a second ratio of training samples that indicate the abnormal status of the target system to the transformed first set of training samples; and program instructions to generate the objective function based on the first and second ratios.

15. The computer program product of claim 10, further comprising:

program instructions, stored on the one or more computer readable storage media, to generate a plurality of model instances for the prediction model;

program instructions, stored on the one or more computer readable storage media, to determine respective weights of the plurality of model instances; and program instructions, stored on the one or more computer readable storage media, to combine the plurality of model instances into an optimized prediction model based on the weights of the plurality of model instances.

16. The computer program product of claim 15, wherein the plurality of model instances comprise a first model instance, and wherein program instructions to determine respective weights of the plurality of model instances comprise:

program instructions to determine respective weights of the transformed first set of training samples;

program instructions to determine a first set of prediction results based on the transformed first set of training samples by using the first model instance; and program instructions to determine a first weight of the first model instance based on the weights of the transformed first set of training samples and the first set of prediction results.

17. The computer program product of claim 16, wherein the plurality of model instances further comprise a second model instance, and wherein program instructions to determine respective weights of the plurality of model instances comprise:

program instructions to update the weights of the transformed first set of training samples based on the first weight of the first model instance;

program instructions to determine a second set of prediction results based on the transformed first set of training samples by using the second model instance; and program instructions to determine a second weight of the second model instance based on the updated weights of the transformed first set of training samples and the second set of prediction results.

18. A computer system comprising:

one or more processors, one or more computer readable storage media, and program instructions stored on the one or more computer readable storage media for execution by at least one of the one or more processors, the program instructions comprising:

program instructions to obtain a first set of training samples, one of the training samples including values of a plurality of performance indicators of a target system observed at a historical point in time;

program instructions to determine that the first set of training samples are unqualified for training a prediction model, the prediction model predicting an operational status of the target system at a target point in time based on values of the plurality of performance indicators observed at the target point in time;

program instructions to perform a dimensional transformation on the first set of training samples, the dimensional transformation comprising:

program instructions to represent the first set of training samples as a first set of points in a first space having a first number of dimensions, one of the plurality of performance indicators corresponding to one of the number of dimensions; and program instructions to transform the first set of points in the first space having the first number of dimensions to a second set of points in a second space having a second number of dimensions, wherein the first number of dimensions is different than the second number of dimensions;

program instructions to determine that the transformed first set of training samples are qualified for training the prediction model; and program instructions to, in response to determining that the first set of training samples are qualified for training the prediction model, train the prediction model based on the first set of training samples.

19. The computer system of claim 18, wherein program instructions to determine that the transformed first set of training samples are qualified for training the prediction model comprise:

program instructions to detect a data characteristic associated with the operational status of the target system from the transformed first set of training samples; and program instructions to, in response to the data characteristic being detected from the transformed first set of training samples, determine that the transformed first set of training samples are qualified for training the prediction model.

20. The computer system of claim 19, wherein program instructions to detect the data characteristic from the transformed first set of training samples comprise:

program instructions to determine that a geometric representation of a predetermined shape is available in the second space for fitting the second set of points, the geometric representation reflecting the data characteristic; and program instructions to, in response to determining that the geometric representation is available in the second space, determine that the data characteristic is detected from the transformed first set of training samples.

* * * * *